Aug. 31, 1954     G. L. SMITH     2,687,930
PISTON FOR INTERNAL-COMBUSTION ENGINES
Filed May 21, 1952     2 Sheets-Sheet 1
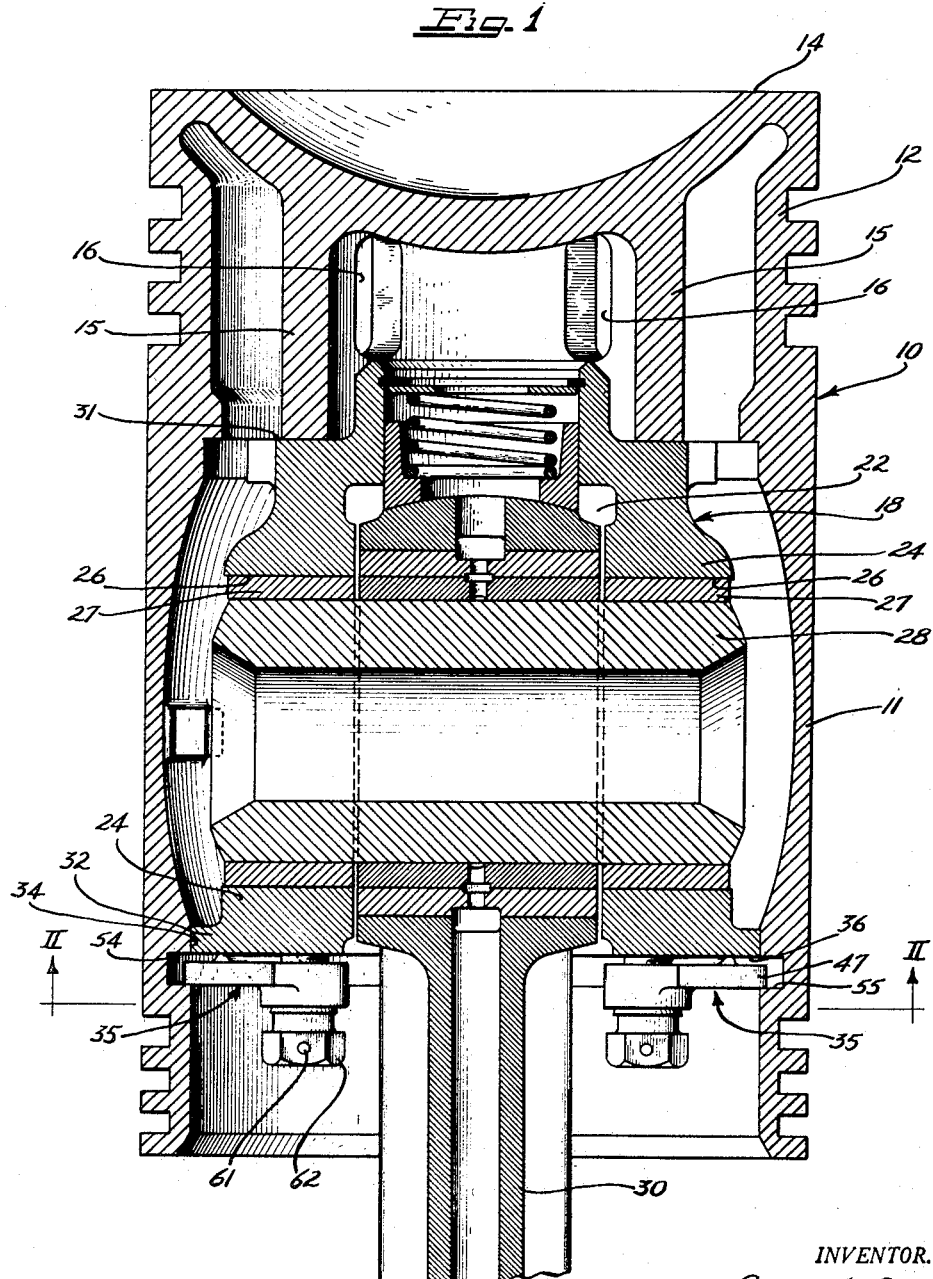
INVENTOR.
GEORGE L. SMITH
BY     ATTY.

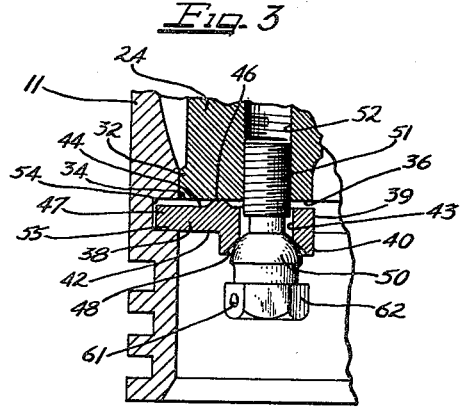
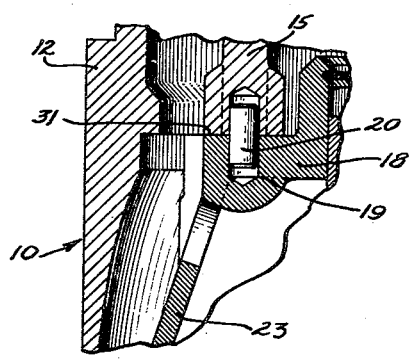
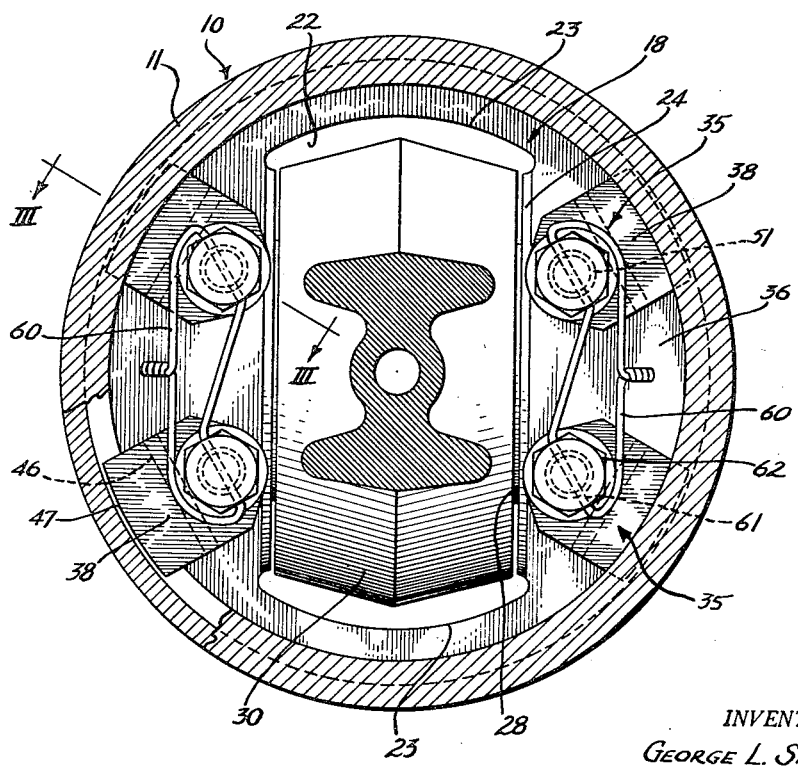
INVENTOR.
GEORGE L. SMITH

Patented Aug. 31, 1954

2,687,930

UNITED STATES PATENT OFFICE 2,687,930

PISTON FOR INTERNAL-COMBUSTION ENGINES

George Lee Smith, Beloit, Wis., assignor to Fairbanks, Morse & Co., Chicago, Ill., a corporation of Illinois Application May 21, 1952, Serial No. 289,049

16 Claims. (Cl. 309—17)

This invention relates to improvements in pistons for internal combustion engines or the like, and more particularly to improvements in the mounting and support of a separately formed connecting rod wrist pin carrier in the piston.

In a piston structure of the character indicated, providing a piston member having a piston head and relatively thin-walled skirt-portions, and a wrist pin carrier assembly within the piston, distortion and undue heat stressing of parts, particularly the head portion, may be very materially reduced by avoiding direct bolting of the carrier to the piston head. Importantly, also, it is found to be highly desirable to effect firm assembly of the wrist pin carrier and piston by a mounting provision which is yieldable to a degree sufficient to compensate for relative expansion and contraction of the parts.

With the foregoing in view, it is an object of the present invention to provide in a piston structure of the form indicated, an improved wrist pin carrier mounting means effective between the carrier and the piston skirt, in a zone of the latter relatively remote from the piston head, for retaining the carrier in firm assembly to the piston with the inner end of the carrier in engagement with abutment means internally of the piston head.

Another object is to provide improved carrier mounting means effective in the manner above indicated, and so constructed and arranged between the carrier and piston skirt as to accommodate relative expansion and contraction of the parts.

A further important object is to provide improved carrier mounting means constituted of retainer elements engaging the carrier and bearing upon shoulder means internally of the piston skirt, wherein each retainer element is in pivotal contact with the carrier and in lever engagement with the skirt shoulder means, such that in carrier mounting skirt stressing is longitudinally of the skirt wall to the substantial exclusion of lateral stressing thereof which would tend to expand the skirt.

Further objects and features of this invention will be apparent from the following description, reference being made to the accompanying drawings, in which:

Figure 1 is a central longitudinal section of a piston and wrist pin assembly embodying the present invention.

Figure 2 is a cross-sectional view, partly broken away, taken on line 2—2 of Figure 1.

Figure 3 is a fragmentary sectional view taken on line 3—3 of Figure 2.

Figure 4 is a fragmentary sectional view taken in a region of contact between the inner end of the wrist pin carrier and the piston head abutment seat therefor, illustrating means for preventing relative rotation of the piston and carrier.

Referring to the drawings, reference numeral 10 designates a piston member including a hollow cylindrical body 11 open at one end and constituting a piston skirt, and a piston head portion 12 providing the crown 14. An annular portion or abutment member 15 projecting inwardly from crown 14 and having openings 16 for cooling oil passage, serves as a mounting seat for an insert member or connecting rod wrist pin carrier 18. Member 15 has at least one bored boss 19 (Fig. 4) for receiving a dowel pin 20 carried by insert member 18, this pin serving to properly locate the wrist pin assembly in the piston and to prevent relative rotation of the piston and the insert or carrier.

The wrist pin carrier or insert member 18 preferably is of one-piece construction, providing a central chamber 22 defined by relatively opposite side walls 23 (Fig. 2) and additional relatively opposite side walls 24 of comparatively thick section. The relatively thick walls 24 have axially aligned bores 26 fitted with suitable bearings 27 mounting the ends of a wrist pin 28, the latter operatively supporting the piston end of a connecting rod 30.

Carrier 18 is formed at its inner end to provide an annular, substantially planar face 31 which in the assembly of the carrier to the piston, engages and seats against the face of the annular abutment member 15. Dowel 20 carried by the carrier and received in the bored boss 19 of member 15 (Fig. 4), assures the desired relative position of the piston and carrier, and serves in addition as before noted, to prevent relative rotation of these parts in the assembled piston structure. Near its outer end, the carrier 18 provides a circular flange 32 for relatively close seating engagement with the inner circular surface portion 34 of the piston skirt 11, the flange thus serving to center the carrier in the piston and to prevent lateral play of the carrier relative to the skirt.

The wrist pin carrier structure is retained in assembly position in the piston by lever members or mounting lugs 35, preferably distributed as shown in Fig. 2, such that a pair thereof is operatively associated with the exposed end face 36 of each wall 24 of the carrier in a manner now to appear. The levers or lugs 35 are of rigid construction, and each provides a plate-like body 38 having one end portion 39 thickened to provide a boss 40 outstanding relative to the side 42 of the body, the end portion and boss being centrally apertured therethrough as at 43 (Fig. 3). Formed on the opposite side 44 of the body is a projection or rib element 46 extending transversely of the body in a zone thereof relatively adjacent its free end 47. Moreover and for a purpose to appear, the boss 40 is recessed concentrically of the bore or aperture 43, to provide a substantially conical seat 48 for receiving the part-spherical head portion 50 of a lug mounting 51 adapted for threaded reception in a threaded aperture 52 in the carrier wall 24.

For reception of the free ends 47 of the lugs in carrier mounting, the piston skirt 11 is provided with an internal annular groove 54 adjacent the surface portion 34 seating the carrier flange 32. The width of the groove 54 is substantially greater than the thickness of the lug ends 47, whereby to facilitate easy insertion of the lug ends therein and to allow for an appreciable degree of pivotal displacement of the lugs, as will be described. Moreover and importantly herein, the groove side face 55, upon which the lug ends 47 bear, provides a lug supporting shoulder the lug bearing surface of which is in a plane normal to the longitudinal axis of the skirt wall. Consequently, in piston assembly, with the lugs positioned relative to the wrist pin carrier and the skirt shoulder 55 as illustrated, the carrier-mounting stress reaction of the skirt wall 11 is in the longitudinal direction of the skirt. Thus in the present example, the skirt wall will be in tension between the piston head and the skirt shoulder 55 receiving the lug ends 47.

Upon insertion of the carrier 18 into assembly position in the piston, each mounting or securing lug 35 is applied to the carrier with its rib element 46 abutting carrier wall face 36, and its free end 47 seated in the skirt groove 54 and bearing against the groove shoulder or side face 55. The associated mounting stud 51 then is passed through the lug aperture 43 and threaded into the carrier wall aperture 52 until the part-spherical head 50 engages the lug seat 48. Whereupon, further threading-in of the stud will produce a pivoting of the lug, with the rib element 46 acting as the pivot or fulcrum element and the lug end 47 as a lever arm in contact with the shoulder or side face 55 of skirt groove 54, to result in displacement of the carrier 18 to assembly position in the piston with its inner face 31 in firm engagement with the piston head abutment 15. Such pivotal movement of each lug 35 relative to its stud 51, is here facilitated by the part-spherical stud head portion 50 and the conical lug seat 48 engaged thereby. When the studs 51 are drawn-up sufficiently to attain firm mounting of the carrier in piston assembly, each of the levers or lugs 35 then will occupy a position substantially normal to the skirt wall 11.

The lugs or levers 35, effective between the carrier and the piston skirt as now described, assure firm mounting of the carrier in a manner which avoids lateral stressing of the piston skirt 11. The lever arm portions 47 of the lugs acting about the fulcrums 46 and bearing against the side face 55 of the skirt groove 54 place the skirt wall in tension, so that the resultant carrier-supporting stress of the skirt is longitudinally of the skirt wall, with practically no lateral stressing thereof. Consequently, the presently improved lug arrangement, while affording a comparatively simple yet highly effective carrier-mounting provision, avoids stressing of the piston skirt in the direction tending to laterally deform or expand the skirt wall.

Another important advantage of the pivotal lug mounting of the carrier as herein provided, is found in the freedom of the lugs to undergo slight pivotal movements sufficient to compensate for relative expansion and contraction of the piston and carrier parts of the assembly. It is to be observed, also, that since the several lugs 35 are mounted independently of each other, one lug may yield to a greater or lesser extent than another, whereby to accommodate unequal expansion or contraction forces in the assembly. While the lugs may yield as for the purpose above described, the maximum degree of compensating pivotal movements thereof normally is very small, and insufficient to affect adversely the intended firm assembly mounting of the carrier to the piston.

Having now described and illustrated a presently preferred embodiment of the invention, what is claimed is:

1. In combination, a hollow piston, a wrist pin carrier, and means for locating and retaining the carrier in assembly position in the piston, said means including lever means pivotally engaging the carrier and extending to carrier-supporting engagement with the piston, and means effective between said lever means and the carrier for determining pivotal positionment of the lever means to retain the carrier in assembly position in the piston.

2. In combination, a hollow piston, a wrist pin carrier, and means for locating and retaining the carrier in assembly position in the piston, said means including a lever member pivotally contacting the carrier and extending to carrier-supporting engagement with the piston, and a lever-pivoting element between the lever member and carrier.

3. In combination, a hollow piston, a wrist pin carrier, and means for locating and retaining the carrier in asssembly position in the piston, said means including a lever member pivotally contacting the carrier and having one end in carrier-supporting engagement with the piston, the opposite end of said lever member having a mounting seat, and a lever-mounting element between the lever and carrier, having a head portion engaging said mounting seat and adapted for permitting pivotal movement of the lever relative thereto.

4. In combination, a hollow piston, a wrist pin carrier, and means for locating and retaining the carrier in assembly position in the piston, said means including a lever member pivotally contacting the carrier and having one end in carrier-supporting engagement with the piston, said lever member providing a substantially conical mounting seat near its opposite end, and a lever-mounting element between the lever and carrier, having a part-spherical portion engaging said conical seat and coacting therewith for permitting pivotal movement of the lever member relative to the mounting element.

5. In combination with a piston having a chamber therein provided with an open end, an annular portion projecting inwardly from the top wall of said chamber, an internal shoulder in said piston, a wrist pin carrier disposed in said chamber and movable into abutment with said annular portion, a flange on said carrier slidably engaging the piston wall, means for retaining said carrier in said chamber including a flat elongated lug having one end disposed adjacent the lower end of said carrier, and its other end disposed in abutting contact with said shoulder, a transverse rib on said lug intermediate the ends thereof and bearing against said carrier, and adjustable means on said one end of said lug engaging said carrier for pivoting said lug about said rib as a fulcrum, urging said carrier against said annular portion.

6. The combination defined by claim 5, wherein the said rib acts against the lower end of said carrier in a zone thereof adjacent the said flange.

7. A piston assembly comprising a piston member providing head and skirt portions, the head portion having an abutment internally of the piston, and the skirt portion providing a shoulder on the inner side of the skirt wall, a connecting rod wrist pin carrier, and means for mounting and retaining said carrier in assembly position in the piston and against said abutment, said means including a mounting member abutting said shoulder and pivotally engaging said carrier, and means on the carrier effecting assembly connection of the mounting member to the carrier.

8. A piston assembly comprising a piston member having an interior chamber and providing abutment and shoulder elements exposed in the chamber and relatively spaced longitudinally of the piston member, a connecting rod wrist pin carrier in the piston chamber and in engagement with the abutment element therein, and means for securing the carrier in assembly to the piston member, said means being constituted by rigid elements each bearing upon said shoulder element and pivotally engaging said carrier, and means connecting the rigid elements to the carrier.

9. A piston assembly comprising a piston member having an interior chamber and providing abutment and shoulder elements exposed in the chamber and relatively spaced longitudinally of the piston member, a connecting rod wrist pin carrier in the piston chamber and in engagement with the abutment element therein, and means for securing the carrier in assembly to the piston member, said means including a rigid element having a rib thereon, arranged with one end bearing upon said shoulder element and said rib in contact with the carrier, and means supporting the opposite end of said rigid element from the carrier.

10. A piston assembly comprising a piston member providing head and skirt portions, the head portion providing an abutment within the piston, and the skirt portion having a recess in the inner side of the skirt wall in a zone thereof relatively remote from the head portion, a connecting rod wrist pin carrier, and means for mounting and retaining said carrier within the piston member in engagement with said abutment, said means including a mounting lug having a rib thereon, arranged with one end bearing against a side face of said skirt wall recess and said rib in engagement with said carrier, and an element on the carrier supporting the opposite end of said lug.

11. In a piston assembly providing a piston member having a skirt portion and a head portion provided with an abutment internally of the piston member, and a connecting rod wrist pin carrier adapted for assembly positionment in the piston with the inner end of the carrier in engagement with said abutment, the combination therewith of means for mounting and retaining the carrier in its assembly position in the piston, said means comprising elements each independently connected to said carrier in pivotal engagement therewith, said elements extending to and being in carrier-supporting engagement with the piston skirt portion such that substantially the entire carrier-supporting stress reaction in said piston skirt occurs in a direction longitudinally of the skirt.

12. In combination with a piston member providing a piston head and a piston skirt, wherein the piston head includes an abutment within the piston, and a connecting rod wrist pin carrier received in the piston with its inner end in engagement with said abutment, means effective substantially entirely between the outer end of the carrier and the piston skirt for supporting and retaining the carrier in assembly to the piston member, said means comprising lug elements each independently pivotally mounted on the outer end of the carrier, said lug elements extending to and being in carrier-supporting engagement with the piston skirt such that substantially the entire carrier-supporting stress reaction in the piston skirt occurs in a direction longitudinally of the skirt.

13. In a piston, a piston member providing piston head and skirt portions, a connecting rod wrist pin carrier adapted for assembly reception in the piston, means forming a carrier mounting seat in the piston adjacent the piston head, shoulder means on the piston skirt interiorly thereof in a zone relatively remote from the piston head, and means effective solely between said shoulder means and the outer end of said carrier for positioning and retaining the carrier in the piston with its inner end against said carrier mounting seat, the last said means comprising lug elements each having a rib thereon intermediate its ends, arranged adjacent the outer end of the carrier such that each lug element has one end thereof in supported engagement with said shoulder means and its rib in contact with said outer end of the carrier, the rib constituting a lug pivot permitting pivotal displacement of the lug element relative to the carrier, and means connecting the opposite end of each lug element such as to cause a lever action of the lug element through its end in engagement with said skirt shoulder means to dispose the carrier in assembly position in the piston.

14. In a piston, a piston member providing a piston head and a cylindrical skirt wall, a connecting rod wrist pin carrier adapted for assembly reception in the piston, a carrier mounting abutment in the piston near the piston head, the skirt wall having an annular recess in its inner side in a zone relatively remote from the piston head, said recess providing a shoulder substantially normal to the longitudinal axis of the skirt wall, and means effective solely between said shoulder and the outer end of said carrier for positioning and retaining the carrier in the piston with its inner end against said abutment, said means comprising lever elements each having a rib thereon intermediate its ends, the lever elements being arranged adjacent the outer end of the carrier and directed substantially normal to the skirt wall such that each thereof has one end in supported engagement with said shoulder and its rib in contact with said outer end of the carrier, and means connecting the opposite end of each lever element to the carrier and operable for pivoting the lever about its rib acting as a pivot in contact with the outer end of the carrier, such as to produce through said one end of the lever in engagement with said skirt shoulder, displacement of the carrier into assembly position with its inner end against said abutment, said lever elements in engagement with the skirt shoulder, coacting therewith in carrier support such that the carrier-supporting stress reaction of the skirt is substantially entirely longitudinally of the skirt wall.

15. A piston assembly comprising a piston member having head and skirt portions, the head portion providing an abutment within the piston and the skirt portion having a shoulder on the inner side of the skirt wall in a zone thereof spaced from the head portion, a connecting rod wrist pin carrier, and means for locating and retaining the carrier in the piston with its inner end in engagement with said abutment, said means including a lever member having one end thereof in carrier-supporting engagement with said shoulder and providing a rib intermediate the lever ends, in carrier-supporting and lever-pivoting engagement with the outer end of the carrier, said lever member providing a mounting seat near its opposite end, and a lever mounting element between the lever and carrier, having a portion engaging said seat and adapted for permitting pivotal movement of the lever member relative to the element.

16. A piston assembly as defined by claim 15, wherein the said lever mounting seat is of conical form and the said portion of the lever mounting element is of part-spherical form.

References Cited in the file of this patent

UNITED STATES PATENTS

| Number | Name | Date |
|---|---|---|
| 1,521,388 | Pielstick | Dec. 30, 1924 |
| 2,372,050 | Barraja-Frauenfelder et al. | Mar. 20, 1945 |
| 2,379,359 | Kettering | June 26, 1945 |
| 2,524,273 | Saler | Oct. 3, 1950 |
| 2,563,371 | Rippingille | Aug. 7, 1951 |